United States Patent
Xiang

(10) Patent No.: US 9,438,049 B2
(45) Date of Patent: Sep. 6, 2016

(54) CONTROL CIRCUIT AND METHOD FOR A PORTABLE CHARGING CARRYING CASE FOR PROVIDING UNINTERRUPTIBLE POWER TO CHARGE ELECTRONIC CIGARETTE BATTERIES

(71) Applicant: Zhiyong Xiang, Guangdong (CN)

(72) Inventor: Zhiyong Xiang, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 289 days.

(21) Appl. No.: 14/061,072

(22) Filed: Oct. 23, 2013

(65) Prior Publication Data
US 2015/0015187 A1    Jan. 15, 2015

(30) Foreign Application Priority Data
Jul. 10, 2013   (CN) .................... 2013 2 0410702 U

(51) Int. Cl.
H02J 7/00    (2006.01)

(52) U.S. Cl.
CPC .............. *H02J 7/0029* (2013.01); *H02J 7/007* (2013.01); *H02J 2007/0037* (2013.01)

(58) Field of Classification Search
CPC ........................................ H02J 7/007
USPC ................................ 320/107, 162
See application file for complete search history.

(56) References Cited

U.S. PATENT DOCUMENTS

| | | | | |
|---|---|---|---|---|
| 5,510,694 A | * | 4/1996 | Nilssen ................ | H02J 7/0042 320/107 |
| 5,602,462 A | * | 2/1997 | Stich ....................... | G05F 1/147 307/64 |
| 5,796,239 A | * | 8/1998 | van Phuoc ......... | G01R 31/3655 320/107 |
| 6,081,104 A | * | 6/2000 | Kern ...................... | H02J 9/065 320/101 |
| 6,169,384 B1 | * | 1/2001 | Shannon ............... | H02J 7/0044 307/66 |
| 6,727,602 B2 | * | 4/2004 | Olson ................... | H02J 7/0013 307/46 |
| 6,735,096 B2 | * | 5/2004 | Chang ...................... | H02J 9/02 307/66 |
| 6,933,627 B2 | * | 8/2005 | Wilhelm .................. | H02J 1/06 307/66 |

(Continued)

OTHER PUBLICATIONS

"Safe Cig Micro Electronic Cigarette Review," Jack Keenan, eDripping.com, Published Jan. 15, 2012, Accessed Sep. 28, 2015, http://edripping.com/e-cig-reviews/safe-cig-micro-electronic-cigarette-review/.*

(Continued)

*Primary Examiner* — Robert Grant
*Assistant Examiner* — John Trischler
(74) *Attorney, Agent, or Firm* — Tim Tingkang Xia, Esq.; Locke Lord LLP

(57) ABSTRACT

A control circuit and method for use with an electronic cigarette box, the control circuit includes a charge management module, an inner battery, a control module, a voltage booster, a batter voltage detective module, a load detective module and an indicative module. According to received signals form the battery voltage detective module, the load detective module and the charge management module, the control module control the voltage booster adjusting a charge voltage supplied from the inner battery and outputting a voltage to charge a charge load, and the control module further control the indicative module displaying a charge state. The control circuit provides indications of various operation states or breakdown states, various charge interfaces, functions of detecting load and protection for inner battery and circuits.

6 Claims, 8 Drawing Sheets

(56) References Cited

U.S. PATENT DOCUMENTS

| | | | | |
|---|---|---|---|---|
| 7,579,809 B2* | 8/2009 | Bowles | H01M 10/46 | 320/107 |
| 7,692,411 B2* | 4/2010 | Trainor | H01M 10/46 | 307/109 |
| 7,808,211 B2* | 10/2010 | Pacholok | H02J 7/022 | 320/140 |
| 8,072,183 B2* | 12/2011 | Griffin, Jr. | H01M 10/46 | 320/106 |
| 8,136,085 B2* | 3/2012 | Skillman | G06F 9/4411 | 710/31 |
| 8,183,824 B2* | 5/2012 | Emek | H05B 33/0815 | 320/107 |
| 8,275,914 B2* | 9/2012 | Kim | G06F 13/4081 | 710/15 |
| 8,558,510 B2* | 10/2013 | Moon | H02J 3/32 | 307/25 |
| 8,564,242 B2* | 10/2013 | Hansford | H01M 2/1055 | 320/107 |
| 8,717,044 B2* | 5/2014 | Sims | H02J 7/042 | 324/691 |
| 2007/0090788 A1* | 4/2007 | Hansford | H01M 2/1055 | 320/107 |
| 2009/0283103 A1* | 11/2009 | Nielsen | A24F 1/30 | 131/273 |
| 2010/0039071 A1* | 2/2010 | Hansford | H01M 2/1055 | 320/162 |
| 2010/0060232 A1* | 3/2010 | Boyles | H02J 7/0027 | 320/107 |
| 2010/0244782 A1* | 9/2010 | Nagayama | B60L 11/1868 | 320/162 |
| 2011/0095728 A1* | 4/2011 | Chen | H02J 7/0055 | 320/162 |
| 2011/0260742 A1* | 10/2011 | Sims | H02J 7/042 | 324/713 |
| 2012/0081068 A1* | 4/2012 | Odaohhara | H02J 7/045 | 320/107 |
| 2012/0227753 A1* | 9/2012 | Newton | A24F 47/008 | 131/347 |
| 2013/0049679 A1* | 2/2013 | Mukai | H01H 85/046 | 320/107 |
| 2013/0169230 A1* | 7/2013 | Li | A24F 47/008 | 320/114 |
| 2013/0193924 A1* | 8/2013 | Kurokawa | H02J 7/0029 | 320/112 |
| 2013/0298922 A1* | 11/2013 | Xiang | A24F 47/008 | 131/329 |
| 2013/0336358 A1* | 12/2013 | Liu | G01K 13/002 | 374/152 |
| 2013/0342157 A1* | 12/2013 | Liu | A24F 15/18 | 320/107 |
| 2014/0055086 A1* | 2/2014 | Malackowski | H01M 2/1055 | 320/107 |
| 2014/0062417 A1* | 3/2014 | Li | H02J 7/007 | 320/136 |
| 2014/0083443 A1* | 3/2014 | Liu | H02J 7/0044 | 131/329 |
| 2014/0091752 A1* | 4/2014 | Serrano | H02J 7/0013 | 320/107 |
| 2014/0239985 A1* | 8/2014 | Sims | H02J 7/042 | 324/713 |
| 2014/0251324 A1* | 9/2014 | Xiang | A24F 47/008 | 128/202.21 |
| 2014/0251356 A1* | 9/2014 | Xiang | G05B 15/02 | 131/329 |
| 2014/0253020 A1* | 9/2014 | Xiang | H02J 7/0029 | 320/107 |
| 2014/0258741 A1* | 9/2014 | Xiang | G06F 1/26 | 713/300 |
| 2014/0283856 A1* | 9/2014 | Xiang | A24F 47/008 | 131/329 |
| 2014/0285937 A1* | 9/2014 | Xiang | H02H 3/202 | 361/91.2 |
| 2014/0291179 A1* | 10/2014 | Xiang | B65D 25/00 | 206/216 |
| 2014/0305820 A1* | 10/2014 | Xiang | A24F 15/18 | 206/236 |
| 2014/0354214 A1* | 12/2014 | Phelps | G07F 15/00 | 320/107 |
| 2014/0354231 A1* | 12/2014 | Xiang | H02J 7/32 | 320/114 |
| 2014/0360512 A1* | 12/2014 | Xiang | H02J 7/00 | 131/328 |
| 2014/0375249 A1* | 12/2014 | Xiang | H02J 7/0047 | 320/107 |
| 2015/0002076 A1* | 1/2015 | Xiang | H02J 7/007 | 320/107 |
| 2015/0015186 A1* | 1/2015 | Xiang | H02J 7/045 | 320/107 |
| 2015/0027466 A1* | 1/2015 | Xiang | H02J 7/0013 | 131/329 |
| 2015/0036250 A1* | 2/2015 | Xiang | H02J 7/0029 | 361/78 |
| 2015/0082859 A1* | 3/2015 | Xiang | G01F 25/0007 | 73/1.35 |
| 2015/0188325 A1* | 7/2015 | Wagner | H02J 7/0085 | 307/31 |
| 2015/0189917 A1* | 7/2015 | Xiang | H01M 10/44 | 131/328 |
| 2015/0364943 A1* | 12/2015 | Vick | H02J 7/025 | 320/108 |

OTHER PUBLICATIONS

"The Safe Cig Blink," ammohead73, youtube, Published Feb. 14, 2012, Accessed Sep. 29, 2015, www.youtube.com/watch?v=idJ0GfUldOQ.*

"Universal Serial Bus: Mini and Micro Connectors," Wiki, Published Wayback Machine Jul. 5, 2012, Accessed Feb. 5, 2016, https://web.archive.org/web/20120705225318/https://en.wikipedia.org/wiki/USB.*

"IBGT of MOSFETs: Which is Better for your Design," Electronic Design, Published Oct. 4, 1999, Accessed Online Feb. 6, 2016, http://electronicdesign.com/power/igbts-or-mosfets-which-better-your-design.*

* cited by examiner

CONTROL CIRCUIT AND METHOD FOR A PORTABLE CHARGING CARRYING CASE FOR PROVIDING UNINTERRUPTIBLE POWER TO CHARGE ELECTRONIC CIGARETTE BATTERIES

CROSS-REFERENCE TO RELATED APPLICATIONS

This non-provisional application claims priorities under 35 U.S.C. §119(a) on Patent Application No. 201320410702.8 filed in P.R. China on Jul. 10, 2013, the entire contents of which are hereby incorporated by reference.

BACKGROUND OF THE INVENTION

1. Technical Field

The present disclosure relates electronic cigarettes. More specifically, the invention relates a control circuit and method for electronic cigarette boxes.

2. Description of the Related Art

A prior art electronic cigarettes box is provided an external power supply through a DC port, a control module in the electronic cigarette box controls charging to a battery in the electronic cigarette box and a battery bar inserted in the electronic cigarette box. In the prior art, the electronic cigarette box can not indicate power level of the inner battery, and cannot remind a smoker when a load is connected with no external power supply provided and lower voltage of the inner battery. Further there is not any provided protection for the circuit in the electronic cigarette box.

Therefore, the prior art cannot meet smokers needs and must be improved.

SUMMARY OF THE INVENTION

The need in the art is addressed by the control circuit of the invention. The invention teaches a control circuit and method for providing indication of charge and discharge state and a protection circuit in an electronic cigarette box.

In one aspect, the control circuit of the electronic cigarettes box includes: a charge management module, an inner battery, a control module and a voltage booster, and further includes a battery voltage detective module, a load detective module and an indicative module; the control module is separately connected to the charge management module, the inner battery, the voltage booster, the battery voltage detective module, the load detective module and the indicative module, the charge management module is connected to the voltage booster and the inner battery coupled to the battery voltage detective module;

The charge management module, inputted a voltage from an external power source, outputs a charge voltage to charge the inner battery and sends a battery charge signal to the control module; the inner battery is configure to output a charge voltage when there is no voltage from the external power source; the battery voltage detective module is configured to detect the inner battery voltage and transmit a battery voltage signal to the control module in real time; the load detective module is configured to detect whether or not a charge load is connected and transmit a load detective signal to the control module in real time;

The control module, according to the battery voltage signal, the load detective signal and the battery charge signal, controls the voltage booster adjusting the charge voltage and charging the charge load, and further controls the indicative module displaying a charge state of the inner battery in real time. The load detective signal is a plugging load signal or an unplugging load signal; the charge state includes information of the inner battery such as: power level, in charge, full charge, low battery voltage and discharge.

In one embodiment, when an external power source is supplied, the control module receives the battery voltage signal and the battery charge signal, and calculates the power level of the inner battery and further controls the indicative module displaying the power level of the inner battery; The control module also controls the indicative module displaying in charge or full charge according the charge state; the control module further controls the voltage booster operative state according a plugging or unplugging load signal.

The control circuit for use with an electronic cigarette box according to the invention, wherein when no external power source is supplied, the control module receives a battery voltage signal, calculates a power level of the inner battery according to the battery voltage signal, and further controls the indicative module displaying the power level of the inner battery;

The control module, when the battery voltage is less than a preset low voltage, also controls the voltage booster stopping operation and the indicative module displaying the low battery voltage. The control module, when the battery voltage is greater than or equal to the preset voltage, controls the voltage booster operative state and the indicative module displaying or not displaying discharge due to a plugging or unplugging load signal.

In one embodiment, the control circuit includes a charge interface module having a battery bar charge interface and Micro-USB charge interface, the charge interface module is separately connected to the voltage booster and the charge load.

The control circuit further includes a battery protective module, the battery protective module is connected to the inner battery and is configured to protect the inner battery when over current occurs.

In one embodiment, the control circuit includes an current and full charge detective module, the current and full charge detective module is separately connected to the control module and the charge interface module;

The current and full charge detective module is configured to detect a charging current to the charge load which is connected to the charge interface module; the control module, according to the charging current, controls the operation state of the voltage booster and further adjusts the charging current, or controls the voltage booster stopping operation when it judges that the charge load is in full charge state according the charge current. The control module includes a micro-processor.

The indicative module includes at least one first LED diode and at least one second LED diode. The first LED is configured to display one of signals of charge in, charge full, low battery voltage and discharge for the inner battery; the second LED is configured to display power level for the inner battery.

The load detective module includes a key switch and a trigger switch, one end of the key switch is connected to the ground, another end of the key switch is connected to the micro processor; one end of the trigger switch is connected to the negative of the charge interface, another end of the trigger switch is connected to micro-processor; The key switch is configured to detect a charge load plugging or unplugging via the Micro-USB charge interface; the trigger switch is configured to detect a charge load plugging or unplugging via the battery bar charge interface.

The battery voltage detective module includes a first divider resistance and a second divider resistance; One end of the first divider resistance is connected to the inner battery, the other end of the first divider resistance is connected to the microprocessor and one end of the second divider resistance, and the other end of the second divider resistance is connected to the microprocessor.

The charge management module includes a fuse, a zener diode, a first transistor, a first MOSFET and a charger control chip. The fuse is separately connected to the external power source and the negative of the zener diode, the anode of the zener diode is connected to the base of the first transistor via a first resistance, the collector of the first transistor is connected to the gate of the first MOSFET via a third resistance, the emitter of the first transistor and the supply of the first MOSFET are connected to the ground, the drain of the first MOSFET is connected to the charger control chip via a fifth resistance; The fuse is used for over current protection; the zener diode is configured to stabilize an inputted voltage, and when the inputted voltage exceeds breakdown voltage of the zener diode, the first transistor will turns on that cause the first MOSFET turning off to cut off the external power source to protect circuits.

The battery voltage detective module includes a first divide resistance and a second divide resistance; One end of the first divide resistance is connected to the charger control chip, another end of the first divide resister is connected to one end of the second divide resistance and the micro processor, another end of the second divide resistance is connected to the micro processor.

The battery protective module includes a protective control chip and switch chip; The protective control chip is configured to control the switch chip turning on or off according to a detected current flowing through the switch chip, and further control whether the inner battery operates.

The current and full charge detective modules a sampling current resistance, one end of the sampling current resistance is connected to the ground; and another end of the sampling current resistance is connected to the negative of the charge interface and connected to the micro processor via a resistance.

The voltage booster includes an inductance, a booster control chip, a diode, a second transistor and second MOSFET, the base of the second transistor is connected to the micro processor via a resistance, the emitter of the second transistor is connected to the ground, the collector of the second transistor is connected to the gate of the second MOSFET, the supply of the second MOSFET receives the charge voltage via a resistance, the drain of the second MOSFET is connected to the inductance, the booster control chip is configured to boost the charge voltage; the micro processor controls the second transistor turning on or off, and further the second MOSFET is turned on or off.

In other aspect, a control method for use with an electronic box is provided by the invention, the control method comprising steps as following:

S1, Generating a charge voltage from a charge management module or an inner battery depending on whether an external power source is inputted, if the charge voltage is generated from the charge management module, then a battery charge signal is transmitted to a control module; a battery voltage detective module detecting a battery voltage of the inner battery in real time and transmitting the battery voltage signal to the control module; a load detective module detecting whether a charge load is plugged and transmitting the load detective signal to the control module;

S2, according to the battery voltage signal, the load detective signal and the battery charge signal, the control module controlling a voltage booster to adjust the charge voltage to the charge load; and the control module further controlling an indicative module to display a charge state.

In one embodiment, when an external power source is inputted, the step S1 further comprising:

The charge management module generating the charge voltage to charge the inner battery and transmitting the battery charge signal to the control module; The battery voltage detective module detecting a battery voltage of the inner battery in real time and transmitting the battery voltage signal to the control module; The load detective module detecting whether a charge load is plugged and transmitting the load detective signal to the control module;

The step S2 further comprising:

The control module receiving the battery voltage signal and the battery charge signal and calculating a power level of the inner battery and further controlling the indicative module to display the power level of the inner battery; The control module also controlling the indicative module to display in charge or full charge according to the power level of the inner battery; The control module further controls the voltage booster operative state according to a plugging or unplugging load signal.

The control method for use with an electronic cigarette box according to the invention, wherein when no external power source is supplied, the step S1 further comprising:

The inner battery directly outputting the charge voltage; The battery voltage detective module detecting a battery voltage of the inner battery in real time and transmitting the battery voltage signal to the control module; The load detective module detecting whether a charge load is plugged and transmitting the load detective signal to the control module;

The step S2 further comprising:

the control module receives a battery voltage signal, calculates a power level of the inner battery according to the battery voltage signal, and further controls the indicative module displaying the power level of the inner battery; The control module, when the battery voltage is less than a preset low voltage, also controls the voltage booster stopping operation and the indicative module displaying the low battery voltage. The control module, when the battery voltage is greater than or equal to the preset voltage, controls the voltage booster operative state and the indicative module displaying or not displaying discharge due to a load plugging or unplugging signal.

To carry out the control circuit and method for use with an electronic cigarette box, following benefit can be achieved: the control circuit includes a charge management module, an inner battery, a control module, a voltage booster, a batter voltage detective module, a load detective module and an indicative module. According to received signals form the battery voltage detective module, the load detective module and the charge management module, the control module control the voltage booster adjusting a charge voltage supplied from the inner battery and outputting a voltage to charge a charge load, and the control module further control the indicative module displaying a charge state. The control circuit provides indications of various operation states or breakdown states, various charge interfaces. The control circuit can detect plugging or unplugging load, and protect the inner battery in the charging process and circuits in the short circuit situation. The charge management module also provide an over voltage protection function.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
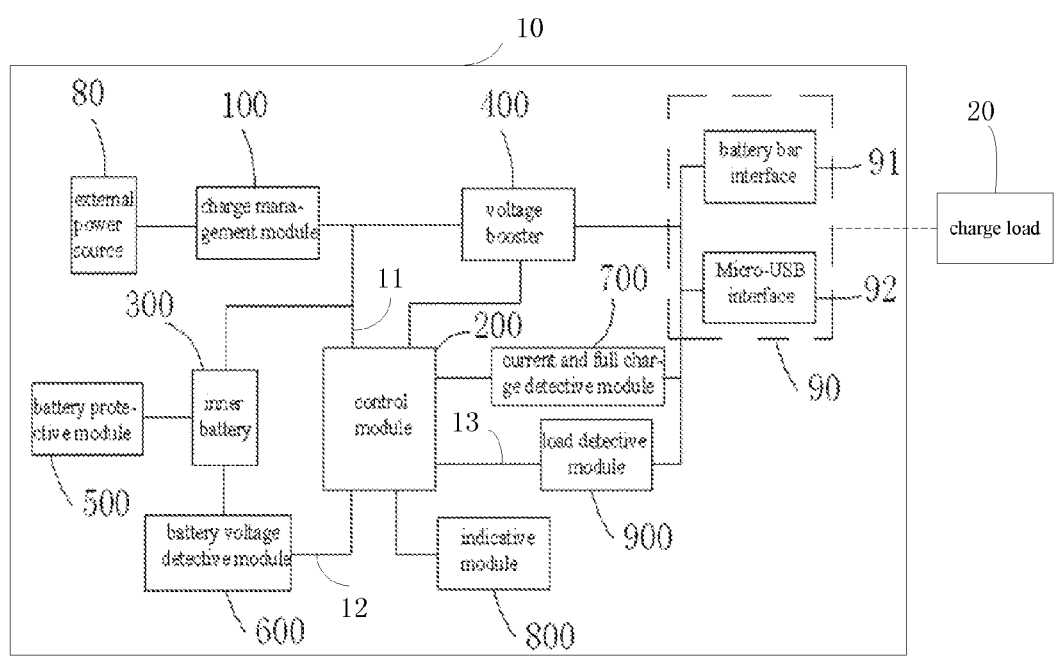
FIG. 1 is a structure schematic diagram of a control circuit for use with an electronic cigarette according to the invention.

FIG. 1 is a structure schematic diagram of a control circuit for an electronic cigarette box 10 according to the invention. As shown in FIG. 1, the control circuit includes a charge management module 100, an inner battery 300, a control module 200, a voltage booster 400, a battery voltage detective module 600, a load detective module 900, an indicative module 800, a charge interface module 90, a battery protective module 500 and a current and full charge detective module 700.

The control module 200 is separately connected to the charge management module 100, inner battery 300, voltage booster 400, battery voltage detective module 600, current and full charge detective module 700, load detective module 900 and indicative module 800. The charge management module 100 is connected to the voltage booster 400 and the inner battery 300 coupled to the battery voltage detective module. The charge interface module 90 is connected voltage booster 400 and a charge load 20, the battery protective module 500 is connected to the inner battery 300, and the current and full charge detective module 700 is connected to the charge interface module 90.

The charge management module 100, inputted a voltage from an external power source 80, outputs a charge voltage to charge inner battery 300 and sends a battery charge signal 11 to control module 200. The inner battery 300 is configured to output a charge voltage when there is no voltage from the external power source 80.

The battery voltage detective module 600 is configured to detect a voltage of the inner battery 300 and transmit a battery voltage signal 12 to control module 200 in real time.

Figure 8:
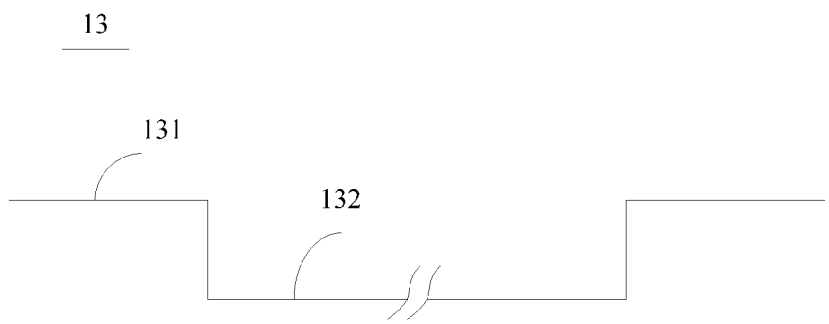
FIG. 8 is a schematic view to show a load detective signal of FIG. 1.

The load detective module 900 is configured to detect whether or not the charge load 20 is connected and transmit a load detective signal 13 to control module 200 in real time. As shown in FIG. 8, the load detective signal 13 is a plugging load signal 131 or an unplugging load signal 132.

Figure 9:
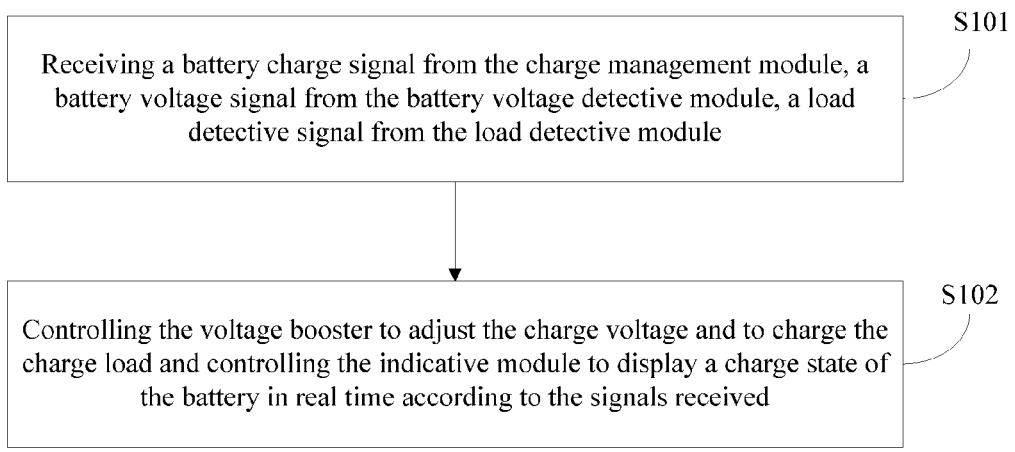
FIG. 9 is a flow chart to show control steps of a control module of FIG. 1.

As shown in FIG. 9, the control module 200, according to the battery voltage signal 12, the load detective signal 13 and the battery charge signal 11, controls the voltage booster 400 adjusting the charge voltage and charging the charge load 20, and further controls the indicative module 800 displaying a charge state of the inner battery 300 in real time.

The charge state includes information of inner battery 300 such as: power level, in charge, full charge, low battery voltage and discharge.

Figure 10:
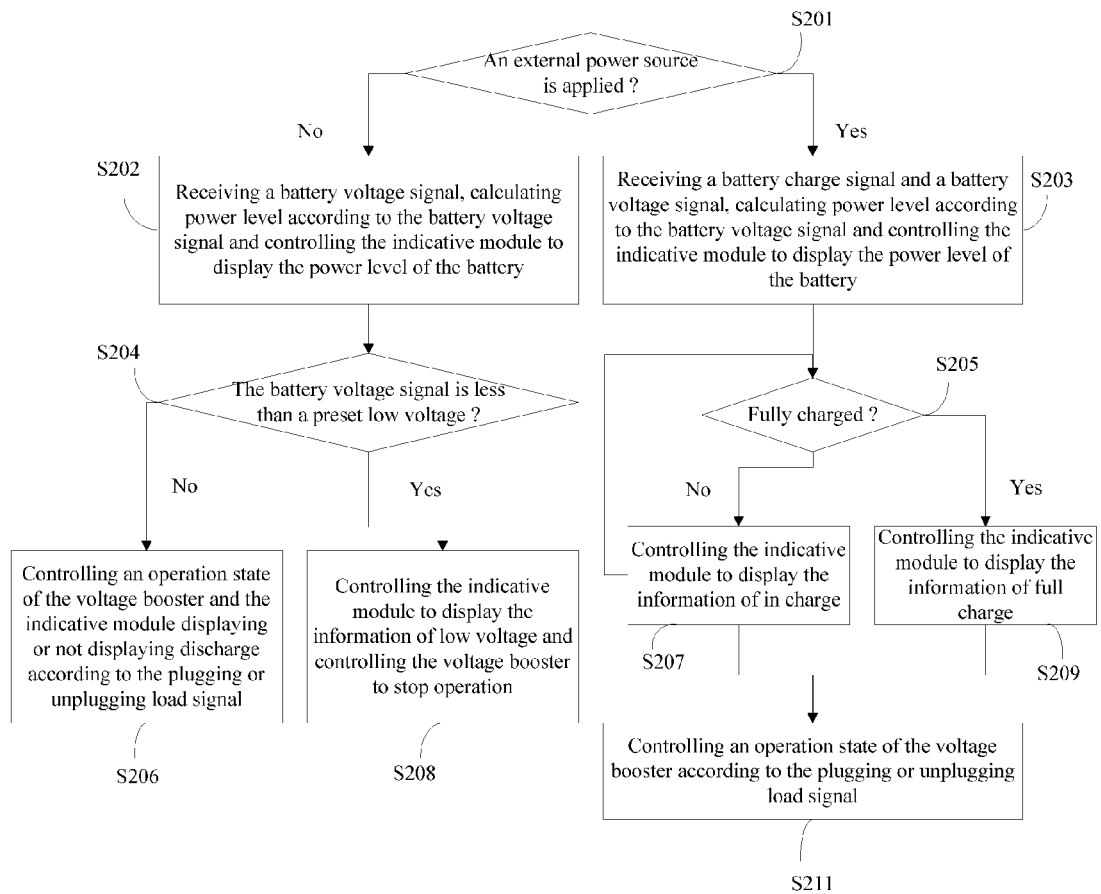
FIG. 10 is another flow chart to show control steps of the control module of FIG. 1.
Figure 11:
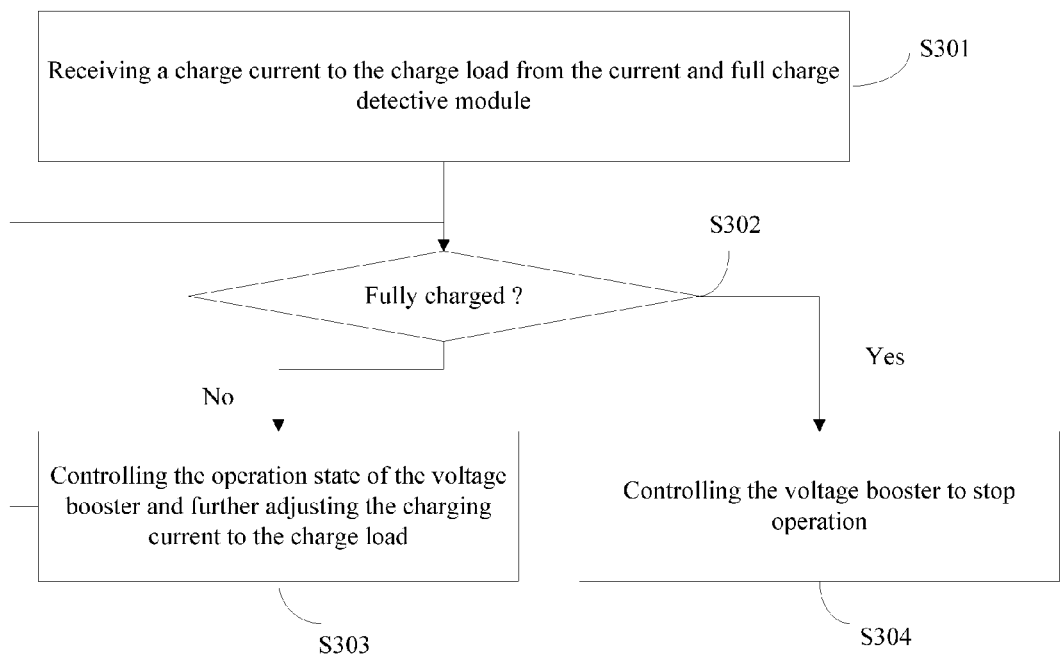
FIG. 11 is another flow chart to show control steps of the control module of FIG. 1.

Specifically, as shown in FIGS. 10 and 11, the control steps of the control module 200 is detailed as follows.

when an external power source is supplied:

Charge management module 100, inputted a voltage from an external power source 80, outputs a charge voltage to charge inner battery 300 and sends a battery charge signal to control module 200;

Control module 200 receives a battery voltage signal and the battery charge signal, and calculates a power level of inner battery 300 and further controls indicative module 800 displaying the power level of inner battery 300;

Control module 200 also controls indicative module 800 displaying in charge or full charge according the charge state;

Control module 200 further controls voltage booster 400 operative state according a plugging or unplugging load signal. Control module 200 can know that external power source 80 is supplied when a battery charge signal is received, and does not need judge whether battery voltage of inner battery 300 is low. Because at this situation external power source supplies the charge voltage to charge a charge load and low voltage inner battery can not discharge to the charge load.

When no external power source 80 is supplied:

Inner battery 300 directly supplies a charge voltage and control module 200 can not receive a battery charge signal, in this situation it is to be considered whether inner battery 300 discharges in low battery voltage.

Control module 200 receives a battery voltage signal, calculates a power level of inner battery 300 according to the battery voltage signal, and further controls indicative module 800 displaying the power level of inner battery 300;

Control module 200, when the battery voltage is less than a preset low voltage, also controls voltage booster 400 stopping operation and indicative module 800 displaying the low battery voltage.

Control module 200, when the battery voltage is greater than or equal to the preset voltage, controls voltage booster 400 operative state and indicative module 800 displaying or not displaying discharge due to a plugging or unplugging load signal. Specifically when the battery voltage is greater than or equal to the preset voltage and control module 200 receives a plugging load signal, then control module 200 controls voltage booster 400 charging the charge load and indicative module 800 displaying discharge; when the battery voltage is greater than or equal to the preset voltage and control module 200 receives an unplugging load signal, then control module 200 controls voltage booster 400 stopping operation and indicative module 800 not displaying discharge.

According to the invention, indicative module 800 provides indications of various operation states or breakdown states. Load detective module 900 can detect plugging or unplugging load. Charge management module also provide an over voltage protection function.

Charge interface module 90 has a battery bar charge interface 91 and Micro-USB charge interface 92, Micro-USB interface can be used for other charge loads except a battery bar of electronic cigarette, such as cell phone battery etc., it is convenient to customer.

Battery protective module 500 is configured to protect inner battery 300 specifically in short circuit condition.

Current and full charge detective module 700 is configured to detect a charge current to the charge load, control module 200, according to the charge current, controls the voltage booster operative state and further adjusting the charge current, or controls the voltage booster stopping operation when it judges that the charge load is in full charge state according the charge current. For example if the charge current detected by current and full charge detective module 700 is greater than normal charge current, control module 200 controls voltage booster 400 lowering the voltage to the charge load so as to adjust the charge current to normal;

If the charge load is fully charged, the charges current should be very small and be detected by current and full charge detective module 700, control module 200 controls voltage booster stopping operation, i.e. stopping charging to the charge load.

A specific circuit of a preferred embodiment of the invention is given for detailed description as below.

Following the node supplying the charging voltage is named as the positive of the inner battery.

Figure 2:
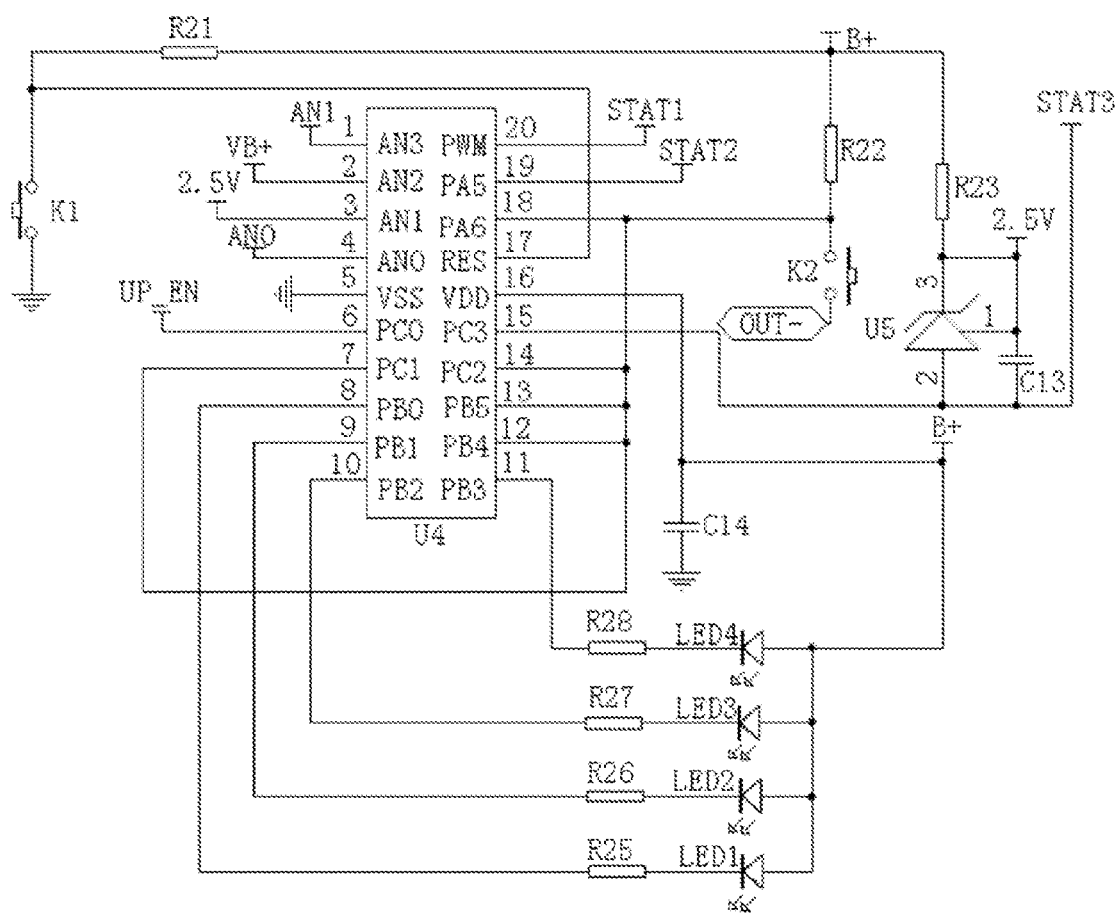
FIG. 2 is a circuit schematic diagram of a control module, a load detective module and an indicative module of FIG. 1.

FIG. 2 is a circuit schematic diagram of a control module, a load detective module and an indicative module of FIG. 1, in FIG. 2, The control module 200 includes a microprocessor U4, a preferred type of microprocessor U4 is HT46R065, made by HOLTEK SEMICONDUCTOR INC. in Guangdong province, China. A VDD pin of microprocessor U4 is connected to the positive of the inner battery and connected to the ground via a capacitor C14, an AN1 pin of microprocessor U4 is connected to 2.5V electric signal and a VSS pin of microprocessor U4 is connected to the ground.

Indicative module 800 includes as least one first LED diode configured to display signals of in charge, full charge, low battery voltage and discharge of the inner battery, and includes at least one second LED diode configured to display power level of the inner battery.

In the embodiment of the invention, advantageously, one first LED diode LED1 and three second LED diodes LED2 to LED4 are chosen. First LED diode LED1 emits red light and second LED diodes LED2 to LED4 emits blue light. The negatives of LED1 to LED4 are separately connected to PB0 to PB3 pins of U4 via resistances R25 to R28, the positives of LED1 to LED4 are all connected to the ground.

Specifically when LED1 displays in charge, it flashes in high frequency, 5 times per second preferably; when LED 1 displays full charge, it emits light and does not flash; when LED1 displays low battery voltage, it flashes in low frequency, one time per two seconds preferably; when LED 1 displays discharge, it flashes in low frequency and its brightness is waning Second LED diodes LED2 to LED4 displays power level of the inner battery, when the power lever is over 30 percent of the full power level, LED2 emits light, when the power level is over 60 percent of the full power level, LED2 and LED3 emit light, and the like.

Therefore indicative module 800 indicates various operative states and breakdown states through LED diodes, and displaying way can be made.

Load detective module 900 includes a key switch K1 and a trigger switch K2, one end of key switch K1 is connected to the ground, the other end of key switch K1 is connected to RES pin of microprocessor U4 and connected to the positive of the inner battery via resistance R21; one end of trigger switch K2 is connected the negative of the charge interface OUT−, the other end of trigger switch K2 is connected to PA6 pin of microprocessor U4 and the positive of the inner battery via resistance R22;

Key switch K1 is configured to detect plugging or unplugging a charge load via Micro-USB interface 92, trigger switch K2 is configured to detect plugging or unplugging a charge load via battery bar interface 91, therefore load detective module 900 can detect plugging or unplugging a charge load.

Figure 3:
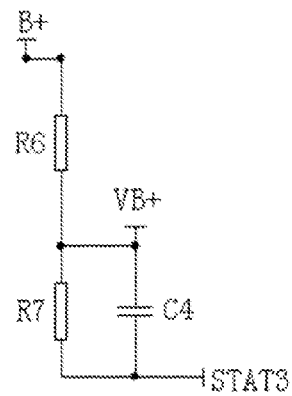
FIG. 3 is a circuit schematic diagram of a battery voltage detective module of FIG. 1.

FIG. 3 is a circuit schematic diagram of a battery voltage detective module of FIG. 1, in FIG. 3

Battery voltage detective module 600 includes a first divider resistance R6, a second divider resistance R7, and filter capacitor C4;

One end of first divider resistance R6 is connected to the positive of the inner battery, the other end of first divider resistance R6 is connected to PC3 pin of microprocessor U4 via second divider resistance R7 and connected to AN2 pin of microprocessor U4, filter capacitor C4 is connected to second divider resistance R7 in parallel, therefore battery voltage detective module 600 can detect voltage of inner battery 600 for calculating power level and low battery voltage protection.

Figure 4:
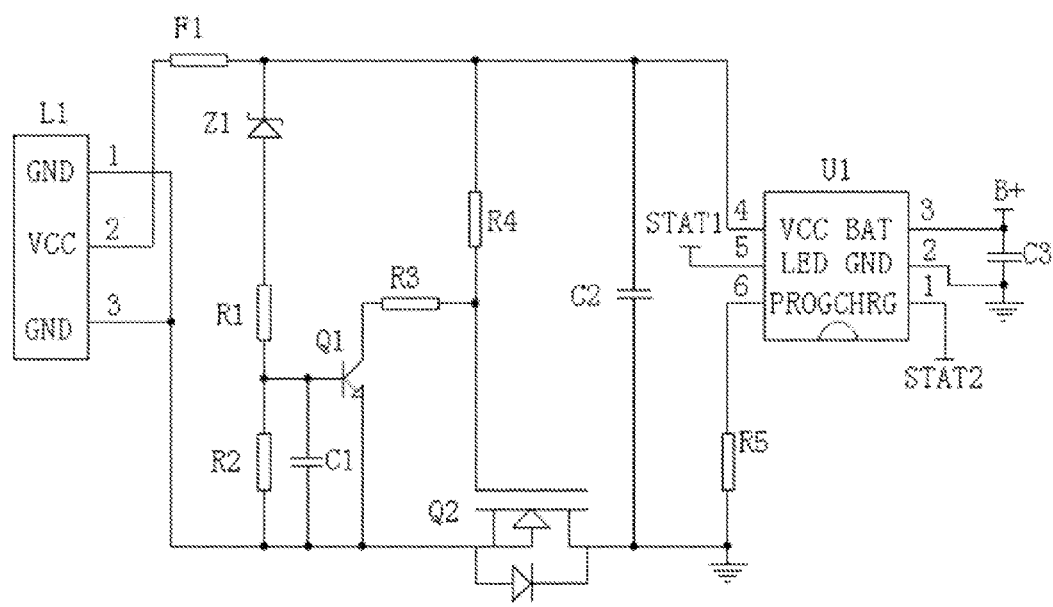
FIG. 4 is a circuit schematic diagram of a charge management module of FIG. 1.

FIG. 4 is a circuit schematic diagram of a charge management module of FIG. 1, in FIG. 4, Charge management module 100 includes a fuse F1, zener diode Z1, a first transistor Q1, a first MOSFET Q2 and a charger control chip U1, type of charger control chip U1 is VA7204. LED pin of charger control chip U1 is connected to PWM pin of microprocessor U4, CHRG pin of charger control chip U1 is connected to PA5 pin of microprocessor U4, and BAT pin of charger control chip U1 is connected to the positive of inner battery 300 and connected to the ground via capacitor C3, BAT pin of charger control chip U1 outputs the charge voltage.

One end of fuse F1 is connected to VCC terminal of interface L1 of external power source 80, the other end of fuse F1 is connected to VCC pin of charger control chip U1 and the negative of zener diode Z1, the positive of zener diode Z1 is connected to the base of first transistor Q1 via first resistance R1, the collector of first transistor Q1 is connected to the gate of first MOSFET Q2 via third resistance R3, the gate of first MOSFET Q2 is connected to VCC pin of charger control chip U1 via forth resistance R4, the emitter of first transistor Q1 and the supply of first MOSFET Q2 are connected to the ground, capacitor C1 and resistance R2 are all separately connected to the base and the emitter of first transistor Q1, the drain of first MOSFET Q2 is connected to PROG pin of charger control chip U1 via fifth resistance R5, VCC pin of charger control chip U1 is connected to the drain of first MOSFET Q2 via capacitor C2.

Fuse F1 is used for over current protection; the zener diode Z1 is configured to stabilize an inputted voltage, and when the inputted voltage exceeds breakdown voltage of the zener diode Z1, first transistor Q1 will turns on that causes first MOSFET Q2 turning off to cut off external power source 80 to protect circuits. So charge management module 100 provides charge management and over voltage protection.

Figure 5:
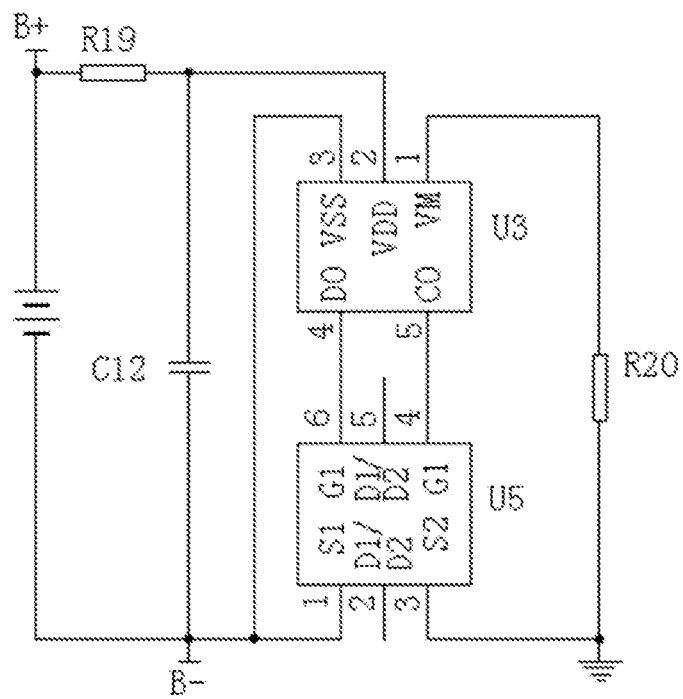
FIG. 5 is a circuit schematic diagram of a battery protective module.

FIG. 5 is a circuit schematic diagram of a battery protective module, in FIG. 5, Battery protective module 500 includes a protective control chip U3, switch chip U5, and filter capacitor C12, resistance R19 and resistance R20;

Type of protective control chip U3 is S8241. Switch chip U5 includes integrated N-MOSFET and switch MOSFET.

One end of resistance R19 is connected to the positive of inner battery 300, the other end of resistance R19 is connected to the negative of inner battery 300 via filter capacitor C12, resistance R20 is separately connected to VM pin of protective control chip U3 and S2 pin of switch chip U5, resistance R20 is configured to prevent current from refluxing.

Protective control chip U3 is configured to control the switch MOSFET turning on or off according to detected current flowing through the integrated N-MOSFET, and further to control whether inner battery 300 works, so battery protective module 500 provides protection for inner battery 300, especially in over current or short circuit situation of inner battery 300; at same time protective control chip U3 also provides protection for over charge or discharge of inner battery 300.

Protective control chip controls switch chip U5 turning on or off according current following switch chip U5, and further controls whether inner battery 300 works.

Figure 6:
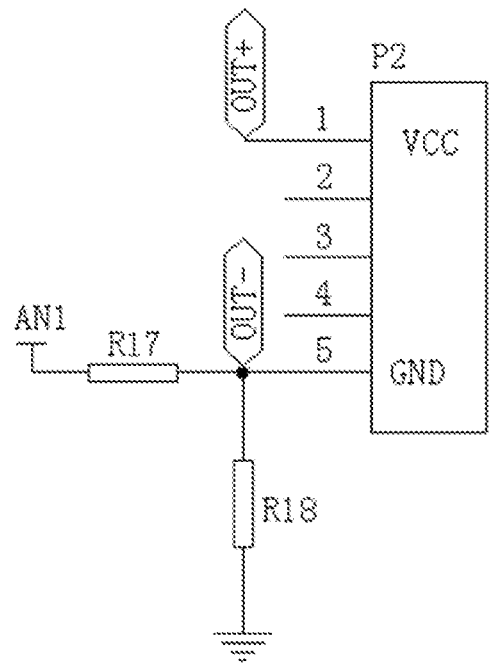
FIG. 6 is a circuit schematic diagram of a current and full charge detective module of FIG. 1.

FIG. 6 is a circuit schematic diagram of a current and full charge detective module of FIG. 1, in FIG. 6, Current and full charge detective module 700 includes a sampling current resistance R18 and R17;

One end of sampling current resistance R18 is connected to the ground, the other end of sampling current resistance R18 is connected the negative of the charge interface OUT− and AN3 pin of microprocessor U4 via resistance R17.

If a charge current detected by sampling current resistance R18 is greater than normal charge current, control module 200 controls voltage booster 400 lowering the voltage to the charge load so as to adjust the charge current to normal; If the charge load is fully charged, the charges current should be very small and be detected by sampling current resistance 18, control module 200 controls voltage booster stopping operation, i.e. stopping charging to the charge load.

Figure 7:
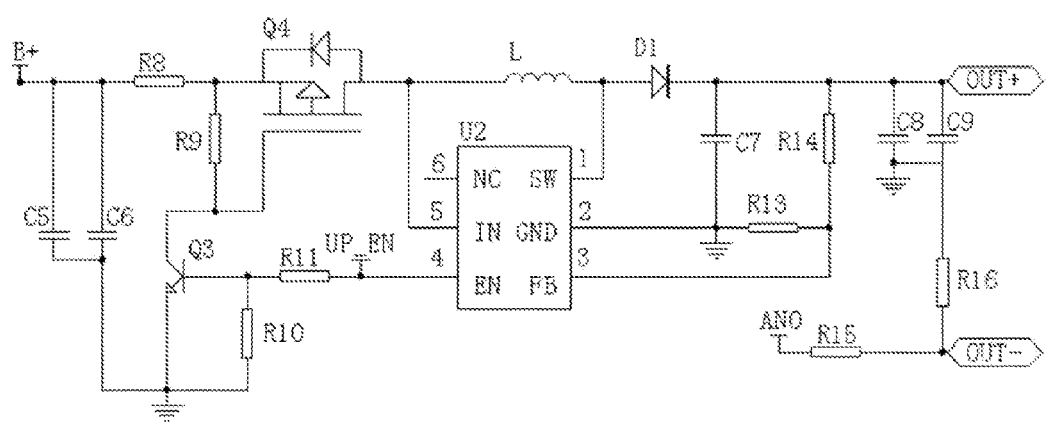
FIG. 7 is a circuit schematic diagram of a voltage booster of FIG. 1.

FIG. 7 is a circuit schematic diagram of a voltage booster of FIG. 1, in FIG. 7, voltage booster 400 includes an inductance L, booster control chip U2, a diode D1, a second transistor Q3 and second MOSFET Q4, type of booster control chip U2 is CP2121. EN pin of booster control chip U2 is connected to PC0 pin of microprocessor U4 and is configured to receive control signal from microprocessor U4.

The base of second transistor Q3 is connected to PC0 pin of microprocessor U4 via resistance R11 and connected to the ground via resistance R10, the emitter of second transistor Q3 is connected to the ground, the collector of second transistor Q3 is connected to the gate of second MOSFET Q4 and connected to the supply of second MOSFET Q4 via resistance R9, the supply of second MOSFET Q4 is connected to the positive of the inner battery via resistance R8, BAT pin of charger control chip U1 provides the charge voltage and connected to the ground via two parallel capacitors C5 and C6, the drain of second MOSFET Q4 is connected to SW pin of booster control chip U2 via inductance L, the positive of diode D1 is connected to SW pin of booster control chip U2, the negative of diode D1 is connected to the positive of the charge interface OUT+ and connected to the ground separately via capacitors C7 to C9, one end of resistance R14 is connected to the negative of diode D1, the other end of resistance R14 is connected to FB pin of charger control chip U1 and connected to the ground via resistance R13, one end of resistance R15 is connected to AN0 pin of microprocessor U4, the other end of resistance R15 is connected to the negative of the charge interface OUT− and connected to the ground via resistance R16.

Booster control chip U2 is configured to boost the charge voltage;

The base of second transistor Q3 is configured to receive control signal from microprocessor U4 that controls second transistor Q3 turning on or off to control second MOSFET Q4 turning on or off and finally controls whether voltage booster 400 operates.

A control method for use with an electronic box is provided by the invention, the control method comprising steps as following:

S1, Generating a charge voltage from charge management module 100 or inner battery 300 depending on whether an external power source is inputted, if the charge voltage is generated from the charge management module 100, then a battery charge signal is transmitted to a control module 200;

battery voltage detective module 600 detecting a battery voltage of inner battery 300 in real time and transmitting the battery voltage signal to the control module 200;

load detective module 900 detecting whether a charge load is plugged and transmitting the load detective signal to control module 200;

S2, control module 200, according to the battery voltage signal, the load detective signal, and the battery charge signal, controlling voltage booster 400 to adjust the charge voltage to the charge load, and controlling indicative module 800 to display a charge state.

When an external power source is inputted, the step S1 further comprising:

Charge management module 100 generating the charge voltage to charge the inner battery 300 and transmitting the battery charge signal to control module 200;

Battery voltage detective module 600 detecting a battery voltage of inner battery 300 in real time and transmitting the battery voltage signal to control module 200;

Load detective module 900 detecting whether a charge load is plugged and transmitting the load detective signal to control module 200;

The step S2 further comprising:

Control module 200 receives a battery voltage signal and the battery charge signal, and calculates a power level of inner battery 300 and further controls indicative module 800 displaying the power level of inner battery 300;

Control module 200 also controls indicative module 800 displaying in charge or full charge according the charge state; when the power level meets the condition of full charge, indicative module 800 displays full charge, otherwise it displays in charge.

Control module 200 further controls voltage booster 400 operative state according a plugging or unplugging load signal; when a plugging load signal is received, control module 200 controls voltage booster 400 operating, when a unplugging load signal is received, control module 200 controls voltage booster 400 stopping operation.

When no external power source is supplied, the step S1 further comprising:

Inner battery 300 directly outputting the charge voltage;

Battery voltage detective module 600 detecting a battery voltage of inner battery 300 in real time and transmitting the battery voltage signal to control module 200;

Load detective module 900 detecting whether a charge load is plugged and transmitting the load detective signal to control module 200;

The step S2 further comprises:

Control module 200 receives the battery voltage signal, calculates a power level of inner battery 300 according to the battery voltage signal, and further controls indicative module 800 displaying the power level of inner battery 300;

Control module 200, when the battery voltage is less than a preset low voltage, also controls voltage booster 400 stopping operation and indicative module 800 displaying the low battery voltage.

Control module 200, when the battery voltage is greater than or equal to the preset voltage, controls voltage booster 400 operative state and indicative module 800 displaying or not displaying discharge due to a plugging or unplugging load signal. Specifically when control module 200 receives a plugging load signal, then control module 200 controls voltage booster 400 charging the charge load and indicative module 800 displaying discharge; when control module 200 receives an unplugging load signal, then control module 200 controls voltage booster 400 stopping operation and indicative module 800 not displaying discharge.

It should be understood, of cause, that forgoing relates to exemplary embodiments of the invention and that modification may be made without departing from the spirit and scope of the invention as set forth in the following claims.

What is claimed is:

1. A control circuit for an electronic cigarette box, comprising:
    a charge management module,
    an inner battery,
    a control module,
    a voltage booster,
    a battery voltage detective module,
    a charge interface module configured to separately connect to the voltage booster and a charge load,
    a load detective module and
    an indicative module;
    wherein, the control module is separately connected to the charge management module, the inner battery, the voltage booster, the battery voltage detective module, the load detective module and the indicative module, the charge management module is connected to the voltage booster and the inner battery coupled to the battery voltage detective module;
    wherein, the charge management module, inputted a voltage from an external power source, outputs a charge voltage to charge the inner battery and sends a battery charge signal to the control module; the inner battery is configure to output a charge voltage when there is no voltage from the external power source;
    wherein, the battery voltage detective module is configured to detect the inner battery voltage and transmit a battery voltage signal to the control module in real time;
    wherein, the load detective module is configured to detect whether or not the charge load is connected and transmit a load detective signal to the control module in real time;
    wherein, the control module, according to the battery voltage signal, the load detective signal and the battery charge signal, controls the voltage booster adjusting the charge voltage and charging the charge load, and further controls the indicative module displaying a charge state of the inner battery in real time;
    wherein the load detective signal is a plugging load signal or an unplugging load signal; the charge state includes information of the inner battery such as: power level, in charge, full charge, low battery voltage and discharge;
    wherein when the external power source is supplied, the control module receives the battery voltage signal and the battery charge signal, and calculates a power level of the inner battery and further controls the indicative module displaying the power level of the inner battery;
    the control module also controls the indicative module displaying in charge or full charge according to the charge state;
    the control module further controls an operation state of the voltage booster according to the plugging or unplugging load signal;
    wherein when no external power source is supplied, the control module receives the battery voltage signal, calculates a power level of the inner battery according to the battery voltage signal, and further controls the indicative module displaying the power level of the inner battery;
    the control module, when the battery voltage is less than a preset low voltage, further controls the voltage booster stopping operation and the indicative module displaying a low battery voltage;
    the control module, when the battery voltage is greater than or equal to the preset low voltage, controls an operation state of the voltage booster and the indicative module displaying or not displaying discharge due to the plugging or unplugging load signal;
    wherein, the charge interface module comprises a battery bar charge interface and a Micro-USB charge interface;
    wherein the control circuit includes a battery protective module, the battery protective module is connected to the inner battery and is configured to protect the inner battery when over current occurs;
    wherein the control circuit includes an current and full charge detective module, the current and full charge detective module is separately connected to the control module and the charge interface module;
    the current and full charge detective module is configured to detect a charging current to the charge load which is connected to the charge interface module, the control module, according to the charging current, controls the voltage booster operative state and further adjusting the charging current, or controls the voltage booster stopping operation when it judges that the charge load is in full charge state according to the charge current;
    wherein, the control module includes a microprocessor;
    wherein the indicative module includes at least one first LED diode and at least one second LED diode; the first LED is configured to display the information of charge in, charge full, low battery voltage or discharge of the inner battery; the second LED is configured to display power level of the inner battery;
    wherein, the load detective module includes a key switch and a trigger switch, an end of the key switch is connected to the ground, an end of the key switch is connected to the microprocessor; an end of the trigger switch is connected to the negative of the charge interface, an end of the trigger switch is connected to the microprocessor;

and wherein, the key switch is configured to detect a charge load plugging or unplugging via the Micro-USB charge interface, and the trigger switch is configured to detect a charge load plugging or unplugging via the battery bar charge interface.

2. The control circuit for an electronic cigarette box of claim 1, wherein the battery voltage detective module includes a first divider resistance and a second divider resistance;

an end of the first divider resistance is connected to the inner battery, an end of the first divider resistance is connected to the microprocessor and an end of the second divider resistance, and an end of the second divider resistance is connected to the microprocessor.

3. The control circuit for an electronic cigarette box of claim 2, wherein the charge management module includes a fuse, a zener diode, a first transistor, a first MOSFET and a charger control chip, the fuse is separately connected to the external power source and a cathode of the zener diode, an anode of the zener diode is connected to a base of the first transistor via a first resistance, a collector of the first transistor is connected to a of the first MOSFET via a third resistance, a emitter of the first transistor and a source of the first MOSFET are connected to a ground, a drain of the first MOSFET is connected to the charger control chip via a fifth resistance;

the fuse is used for over current protection; the zener diode is configured to stabilize an inputted voltage; and when the inputted voltage exceeds a breakdown voltage of the zener diode, the first transistor will turn on, which that causes the first MOSFET turning off to cut off the external power source to protect circuits.

4. The control circuit for an electronic cigarette box of clam 3, wherein the battery protective module includes a protective control chip and a switch chip;

the protective control chip is configured to control the switch chip turning on or off according to a detected current flowing through the switch chip, and further control whether the inner battery operates.

5. The control circuit for an electronic cigarette box of claim 4, wherein the current and full charge detective modules a sampling current resistance, an end of the sampling current resistance is connected to the ground, and an end of the sampling current resistance is connected to the negative of the charge interface and connected to the microprocessor via a resistance.

6. The control circuit for an electronic cigarette box of claim 5, wherein the voltage booster includes an inductor, a booster control chip, a diode, a second transistor and a second MOSFET, a base of the second transistor is connected to the microprocessor via a resistance, a emitter of the second transistor is connected to the ground, a collector of the second transistor is connected to a gate of the second MOSFET, a source of the second MOSFET receives the charge voltage via a resistance, a drain of the second MOSFET is connected to the inductor, the booster control chip is configured to boost the charge voltage; the microprocessor controls the second transistor to be turned on or off, and further the second MOSFET is turned on or off.

* * * * *